United States Patent [19]
Helber et al.

[11] Patent Number: 5,834,173
[45] Date of Patent: Nov. 10, 1998

[54] FILTER DYES FOR PHOTOGRAPHIC ELEMENTS

[75] Inventors: Margaret Jones Helber; Donald Richard Diehl, both of Rochester; Terrence Robert O'Toole, Webster, all of N.Y.

[73] Assignee: Eastman Kodak Company, Rochester, N.Y.

[21] Appl. No.: 673,395

[22] Filed: Jun. 28, 1996

Related U.S. Application Data

[63] Continuation-in-part of Ser. No. 577,997, Dec. 22, 1995, abandoned.

[60] Provisional application No. 60/001,801, Aug. 2, 1995.

[51] Int. Cl.⁶ .............................. G03C 1/06; G03C 1/815; G03C 1/825

[52] U.S. Cl. .................... 430/522; 430/510; 430/511; 430/517

[58] Field of Search ...................... 430/510, 511, 430/517, 522

[56] References Cited

U.S. PATENT DOCUMENTS

| | | | |
|---|---|---|---|
| 2,533,472 | 12/1950 | Keyes et al. | 430/517 |
| 4,294,917 | 10/1981 | Postle et al. | 430/522 |
| 4,311,787 | 1/1982 | Lemahieu et al. | 430/522 |
| 4,803,150 | 2/1989 | Dickerson et al. | 430/502 |
| 4,855,221 | 8/1989 | Factor et al. | 430/510 |
| 4,857,446 | 8/1989 | Diehl et al. | 430/510 |
| 4,861,700 | 8/1989 | Shuttleworth et al. | 430/517 |
| 4,900,652 | 2/1990 | Dickerson et al. | 430/502 |
| 4,900,653 | 2/1990 | Factor et al. | 430/522 |
| 4,923,788 | 5/1990 | Shuttleworth et al. | 453/507 |
| 4,940,654 | 7/1990 | Diehl et al. | 430/522 |
| 4,948,717 | 8/1990 | Diehl et al. | 430/510 |
| 4,948,718 | 8/1990 | Factor et al. | 430/522 |
| 4,950,586 | 8/1990 | Diehl et al. | 430/507 |
| 4,988,611 | 1/1991 | Anderson et al. | 430/522 |
| 5,213,956 | 5/1993 | Diehl et al. | 430/522 |
| 5,213,957 | 5/1993 | Adachi | 430/522 |
| 5,260,179 | 11/1993 | Diehl et al. | 430/522 |
| 5,266,454 | 11/1993 | Diehl et al. | 430/522 |
| 5,360,702 | 11/1994 | Zengerle et al. | 430/522 |
| 5,457,014 | 10/1995 | Zengerle et al. | 430/522 |
| 5,459,026 | 10/1995 | Nakamura et al. | 430/517 |

FOREIGN PATENT DOCUMENTS

| | | |
|---|---|---|
| 0 430 186 | 6/1991 | European Pat. Off. . |
| 0 529 737 A1 | 3/1993 | European Pat. Off. . |
| 04 136 935 A | 5/1992 | Japan . |
| 06 289 538 A | 10/1994 | Japan . |
| 07 128 792 A | 5/1995 | Japan . |
| 542 905 | 2/1942 | United Kingdom . |
| WO 95 19169 A | 7/1995 | WIPO . |

Primary Examiner—Geraldine Letscher
Attorney, Agent, or Firm—Edith A. Rice

[57] ABSTRACT

A photographic element contains a dye of Formula (I):

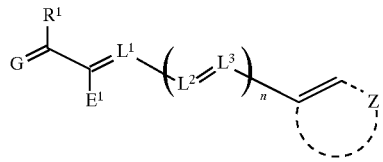

wherein G represents O or dicyanovinyl ($-C(CN)_2$); $E^1$ represents an electron withdrawing group; $R^1$ represents a substituted or unsubstituted aryl group or a substituted or unsubstituted hetereoaryl group; $L^1$, $L^2$ and $L^3$ each independently represent substituted or unsubstituted methine groups; Z represents non-metal atoms which may be assembled to form a five- or six-membered heterocyclic ring other than furan; and n represents 0 or 1; and wherein the dye comprises at least one ionizable group with a pKa value between 4 and 12.

19 Claims, No Drawings

FILTER DYES FOR PHOTOGRAPHIC ELEMENTS

This application is a continuation in part of application Ser. No. 08/577,997 filed Dec. 22, 1995, which in turn claims priority from provisional application 60/001,801, filed Aug. 28, 1995. The entire disclosures of these applications are incorporated herein by reference.

FIELD OF THE INVENTION

This invention relates to a photographic element comprising a novel filter dye.

BACKGROUND OF THE INVENTION

Photographic materials may utilize filter dyes for a variety of purposes. Filter dyes may be used to adjust the speed of a radiation-sensitive layer; they may be used as absorber dyes to increase image sharpness of a radiation-sensitive layer; they may be used as antihalation dyes to reduce halation; they may be used to reduce the amount or intensity of radiation from reaching one or more radiation-sensitive layers, and they may also be used to prevent radiation of a specific wavelength or range of wavelengths from reaching one or more of the radiation-sensitive layers in a photographic element. For each of these uses, the filter dye(s) may be located in any number of layers of a photographic element, depending on the specific requirements of the element and the dye, and on the manner in which the element is to be exposed. The amount of filter dyes used varies widely, but they are preferably present in amounts sufficient to alter in some way the photographic response of the element. Filter dyes may be located in a layer above a radiation-sensitive layer, in a radiation-sensitive layer, below a radiation-sensitive layer, or in a layer on the opposite side of the support from a radiation-sensitive layer.

Photographic materials often contain layers sensitized to different regions of the spectrum, such as red, blue, green, ultraviolet, infrared, X-ray, to name a few. A typical color photographic element contains a layer sensitized to each of the three primary regions of the visible spectrum, i.e., blue green, and red. Silver halide used in these materials has an intrinsic sensitivity to blue light. Increased sensitivity to blue light, along with sensitivity to green light or red light, is imparted through the use of various sensitizing dyes adsorbed to the silver halide grains. Sensitized silver halide retains its intrinsic sensitivity to blue light.

If, prior to processing, blue light reaches a layer containing silver halide which has been sensitized to a region of the spectrum other than blue, the silver halide grains exposed to the blue light, by virtue of their intrinsic sensitivity to blue light, would be rendered developable. This would result in a false rendition of the image information being recorded in the photographic element. It is therefore a common practice to include in the photographic element a material that filters blue light. This blue-absorbing material can be located anywhere in the element where it is desirable to filter blue light. For example, in a color negative film or color reversal film that has layers sensitized to each of the primary colors, it is common to have the blue-sensitized layer closest to the exposure source and to interpose a blue-absorbing, or yellow filter layer between the blue-sensitized layer and the green- and red- sensitized layers.

The material most commonly used as a blue absorbing material in photographic elements is yellow colloidal silver, referred to in the art as Carey Lea silver. It absorbs blue light during exposure and is readily removed during processing, usually during the silver bleaching and fixing steps. Carey Lea silver, however, exhibits unwanted absorption in the green region of the spectrum. Also, silver can be an expensive component of a photographic element and can cause unwanted photographic fog.

A number of yellow dye alternatives for Carey Lea silver have been suggested. These include dyes disclosed in U.S. Pat Nos. 2,538,008, 2,538,009, and 4,420,555, and U.K. Pat. Nos. 695,873 and 760,739. Many of these dyes, although they exhibit the requisite absorption of blue light, also are subject to stain problems. Many filter dyes, of various hues, for use in photographic elements suffer from stain problems. Some dyes are not fully decolorized or removed during photographic processing, thus causing post processing stain. Filter dyes incorporated as latex dispersions are especially prone to post-process stain problems. Other known filter dyes wander into other layers of the element, adversely affecting image quality. Dyes immobilized with cationic mordants are especially prone to wandering within the photographic element.

Blue-absorbing filter dyes incorporated as solid particle microcrystalline dye dispersions have been developed to address some of the problems of dye wandering and stain. U.S. Pat. Nos. 4,950,586, 4,948,718, 4,948,717, 4,940,654, 4,923,788, 4,900,653, 4,861,700, 4,857,446, 4,855,221, 5,213,956 and 5,213,957, and EP 430,186 disclose the use of various dyes in solid particle dispersions. However, in general, these dyes are broad and often exhibit unwanted absorption in the green region of the spectrum. The exact range of desirable absorbance for a blue-absorbing filter dye can vary depending on the photographic element being designed for use. However, in a typical color photographic element in which a filter dye will be coated above a green-sensitive layer, it is desirable for the dye to exhibit high absorbance in blue region of the spectrum below about 500 nm, and possess a sharp cutting bathochromic absorbance such that there is no appreciable absorbance above about 500 nm. Many blue-absorbing microcrystalline dyes which do not absorb in the green region of the spectrum are too hypsochromic to provide adequate absorption in the longer wavelengths of the blue region. Therefore it would be desirable to provide a filter dye for use in photographic elements that possesses high requisite absorbance in the blue region of the spectrum below about 500 nm, but little or no absorbance above about 500 nm, and furthermore does not suffer from incubative or post process stain problems, and furthermore is not prone to migration in the coated film, but is fully removed upon processing.

SUMMARY OF THE INVENTION

One object of this invention is to provide a filter dye that possesses high absorbance in the blue region of the spectrum below about 500 nm, but little or no absorbance above about 500 nm.

Another objective of the invention is to provide a silver halide radiation-sensitive material containing at least one dye, incorporated in a hydrophilic colloid layer, which is decolorized irreversibly by photographic processing and which causes no deleterious effects on the silver halide photographic emulsions before or after processing.

A further objective of the invention is to provide a silver halide radiation-sensitive material in which a hydrophilic colloid layer is dyed and exhibits excellent decolorizing properties upon photographic processing.

Yet another objective is to provide a silver halide radiation-sensitive material in which a hydrophilic colloid layer is dyed and exhibits high absorbance in a portion of the blue spectral region just below about 500 nm, but possesses comparatively little absorbance above about 500 nm.

One aspect of this invention comprises a photographic element containing a dye of Formula (I):

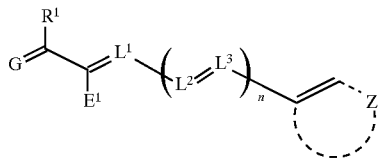

wherein G represents O or dicyanovinyl (—C(CN)$_2$); $E^1$ represents an electron withdrawing group; $R^1$ represents a substituted or unsubstituted aryl group or a substituted or unsubstituted heteroaryl group; $L^1$, $L^2$ and $L^3$ each independently represent substituted or unsubstituted methine groups; Z represents non-metal atoms which may be assembled to form a five- or six-membered heterocyclic ring other than furan; and n represents 0 or 1; and wherein the dye comprises at least one ionizable group with a pKa value between 4 and 12.

Advantageous Effects Of The Invention

This invention provides a dye useful in a photographic element as a filter dye that exhibits a sharp cutting bathochromic characteristic strongly absorbing light at wavelengths below about 500 nm but absorbing comparatively little at wavelengths greater than about 500 nm. Further the dye exhibits high covering power at its coating λmax. The dyes can be used as microcrystalline solid particle dye dispersions in a photographic element and exhibit little, if any tendency to wander within the element and upon processing are substantially free of post-process stain problems.

DETAILED DESCRIPTION OF THE INVENTION

As noted above, the photographic element of this invention comprises a photographic element comprising at least one light sensitive hydrophilic colloid layer and at least one other hydrophilic colloid layer, wherein at least one of said layers comprises a dye of Formula (I).

In Formula (I), El is an electron withdrawing group. Electron withdrawing groups in organic compounds are well known in the art, such as described by March, Advanced Organic Chemistry, 3rd Ed., p.238, the disclosure of which is incorporated herein by reference in its entirety. Examples of such groups include cyano, acyl, aminocarbonyl and alkoxycarbonyl.

$R^1$ represents a substituted or unsubstituted aryl group or a substituted or unsubstituted hetereoaryl group. Examples of aryl groups include phenyl, naphthyl, anthracenyl and styryl. Examples of hetereoaryl groups include pyridyl, furyl, pyrolyl and thiopheneyl.

$L^1$, $L^2$ and $L^3$ each independently represent substituted or unsubstituted methine groups. $L^1$, $L^2$, and $L^3$ may each be optionally substituted with preferred substituents being alkyl groups between 1 to 6 carbon atoms. Other useful substituents for $L^1$, $L^2$ and $L^3$ include those listed below for $R^4$, $R^5$, $R^6$ and $R^8$.

Z represents non-metal atoms assembled to form a five- or six-membered heterocyclic ring other than furan. Heterocyclic rings formed by Z can be for example pyrrole, indole, pyrazole, pyrazolopyrimidone and benzindole. Dyes in which Z is an indole ring, a benzindole ring or a pyrrole ring are preferred.

The dye of Formula (I) contains at least one ionizable group possessing a pKa of 4 to 12, preferably sulfamoyl, carboxy or sulfonamido. Sulfamoyl groups have the formula $R^9NHSO_2$—, carboxyl groups have the formula —$CO_2H$ and sulfonamido groups have the formula —$NHSO_2R^{10}$ where $R^9$ and $R^{10}$ is substituted or unsubstituted alkyl or aryl as described below for $R^4$, $R^5$, $R^6$ and $R^8$. At least one ionizable group on the dye of Formula (I) is preferably bound directly to an aromatic ring.

In a preferred embodiment, $E^1$ is cyano, $R^1$ is substituted or unsubsitiuted phenyl.

The dyes of Formula (I) may be incorporated into the photographic element in any of the ways known in the art, but preferably as a dispersion of solid microcrystalline particles of the dye.

Solid particle dispersions of the compound of Formula (I) are useful as general purpose filter dyes, alone or in combination with other filter dyes in photographic elements. They are insoluble at coating pH's of 6 or less (generally 4–6) and soluble at processing pH's of 8 or more (generally 8–12), so that they do not interact with other components of the photographic element, yet are still fully solublized during photographic processing.

A particular advantage of the dyes of the invention is that they provide higher covering power at their coating λmax than comparable known solid particle dyes. This advantage is particularly important in modern film formats and processing conditions, as filter dyes with high covering power need not be coated at as high a coverage as dyes with lower covering power in order to achieve the same degree of light filtration. In addition to reducing manufacturing costs, lower levels of coated dyes will reduce the level of dye residue built up in the processing solutions, and the resulting lower levels of dissolved dye residue removed from photographic elements will have reduced environmental impact.

A further advantage of dyes of the invention is that they generally possess absorbance envelopes that are sharper cutting on the bathochromic side than comparable known solid particle dispersion dyes such as the structural analogs disclosed in EP 430,186 and U.S. Pat. No. 5,213,957. This feature is especially advantageous when strong light absorbance is required in a spectral region up to a specific λmax, and maximum light transmission is required past the specified λmax. Such filter or trimmer dyes are especially useful when coated in specific layers of color photographic films to effectively prevent light of a specific wavelength region from exposing radiation-sensitive layers below the light filtration layer containing the dye, without causing unwanted absorption of longer wavelength radiation. A yellow filter dye coated directly above a green-sensitive silver halide layer is a particularly advantageous example of such absorbance features, and excellent blue/green speed separation can be realized. In a typical color photographic element, it is desirable to have a blue-absorbing filter dye which when coated absorbs strongly at wavelengths close to 500 nm, but which absorbs comparatively little at wavelengths greater than 500 nm. It should be emphasized that the exact envelope of desirable light absorbance for a filter dye, even specifically a yellow filter dye, varies tremendously from one photographic element to another depending on the intended purpose of the material. Some photographic elements might require a filter dye, such as a yellow filter dye, which absorbs strongly up to a wavelength somewhat shorter or longer than 500 nm, but is sharp cutting on the bathochromic side, mostly transmitting wavelengths of light past the desired absorbance λmax. The feature of coated dye absorbance exhibiting a sharp cutting bathochromic characteristic is fundamentally useful for wavelength-specific light filtration, though the exact wavelength of desired spectral shift from absorbance to transmission may be different for different photographic materials.

In a preferred embodiment of the invention, the objectives and advantages of the invention are met by radiation-sensitive photographic elements wherein the dye according to Formula (I) has Formula (II):

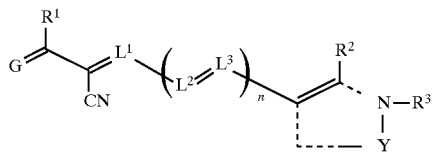

wherein G, $R^1$, $L^1$, $L^2$, $L^3$ and n are as defined above with regard to Formula (I); Y represents non-metal atoms which form a five- or six-membered heterocyclic ring optionally comprising a fused, substituted or unsubstituted benzene ring; and $R^2$ and $R^3$ independently represent hydrogen, or a substituted or unsubstituted alkyl, aryl, or acyl groups. At least one ionizable group on the dye of Formula (II) is preferably bound directly to an aromatic ring. In a preferred embodiment of the invention, G is preferably O.

In a particularly preferred embodiment of the invention, the objectives and advantages of the invention are met by radiation-sensitive photographic elements wherein the dye according to Formula (I) has Formula (III)

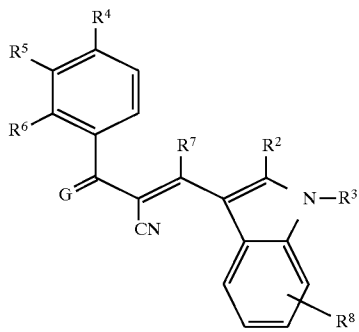

wherein G, $R^2$ and $R^3$ are defined as above with regard to Formula (I) and Formula (II); $R^4$, $R^5$, $R^6$ and $R^8$ each independently represent a substituted or unsubstituted alkyl aryl, or aryloxy group, or one of the following substituents: hydrogen, halogen, cyano, amino, alkoxy, alkoxycarbonyl, amido, acyl, alkylamino, carboxy, sulfonamido, sulfamoyl, or hydroxy; or represent atoms necessary to form a carbocyclic or heterocyclic ring fused with the aryl ring to which they are attached and $R^7$ is a substituted or unsubstituted alkyl or acyl group. In a preferred embodiment, at least one of $R^4$, $R^5$, $R^6$ or $R^8$ is an ionizable group such as sulfonamido, carboxyl, or sulfamoyl. Preferably $R^7$ is methyl or ethyl.

In Formula (I), (II) and (III), illustrative alkyl groups include methyl, ethyl, n-propyl, n-hexyl, or isohexyl. Examples of substituted alkyl groups include, for example, methoxyethyl, hydroxymethyl, etc. Examples of alkoxy groups include, for example, methoxy, ethoxy, butoxy. Examples of aryl groups include phenyl, naphthyl, anthracenyl, pyridyl, and styryl. Examples of substituted aryl groups include, for example, tolyl, m-chlorophenyl, p-methanesulfonylphenyl, etc. Examples of acyl groups include for example, ethoxycarbonyl, amido, benzoyl, carboxy and acetyl.

When reference in this application is made to a substituent "group", this means that the substituent may itself be substituted or unsubstituted (for example "alkyl group" refers to a substituted or unsubstituted alkyl). Generally, unless otherwise specifically stated, substituents on any "groups" referenced herein or where something is stated to be possibly substituted, include the possibility of any groups, whether substituted or unsubstituted, which do not destroy properties necessary for the photographic utility. For example, the filter dyes of this invention should not contain a substituent, such as a sulfo substituent, which renders the dye soluble at coating pH's. It will also be understood throughout this application that reference to a compound of a particular general formula includes those compounds of other more specific formula which specific formula falls within the general formula definition. Examples of substituents on any of the mentioned groups can include known substituents, such as: halogen, for example, chloro, fluoro, bromo, iodo; alkoxy, particularly those with 1 to 6 carbon atoms (for example, methoxy, ethoxy); substituted or unsubstituted alkyl, particularly lower alkyl (for example, methyl, trifluoromethyl); alkenyl or thioalkyl (for example, methylthio or ethylthio), particularly either of those with 1 to 6 carbon atoms; substituted and unsubstituted aryl, particularly those having from 6 to 20 carbon atoms (for example, phenyl); and substituted or unsubstituted heteroaryl, particularly those having a 5 or 6-membered ring containing 1 to 3 heteroatoms selected from N, O or S (for example, pyridyl, thienyl, furyl, pyrrolyl); and others known in the art. Alkyl substituents may specifically include "lower alkyl", that is having from 1 to 6 carbon atoms, for example, methyl, ethyl, and the like. Further, with regard to any alkyl group, alkylene group or alkenyl group, it will be understood that these can be branched or unbranched and include ring structures.

Examples of preferred dyes of this invention are listed below.

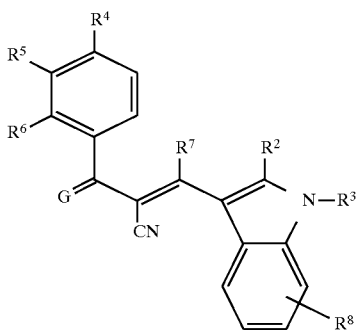

| Dye | R⁴ | R⁵ | R⁶ | R² | R³ | R⁷ | R⁸ | G |
|---|---|---|---|---|---|---|---|---|
| 1 | NHSO₂CH₃ | H | H | H | H | H | H | O |
| 2 | COOH | H | H | H | H | H | H | O |
| 3 | NHSO₂CH₃ | H | H | H | H | H | H | C(CN)₂ |
| 4 | NHSO₂C₃H₇ | H | H | H | H | H | H | O |
| 5 | NHSO₂CH₃ | H | H | CH₃ | H | H | H | O |
| 6 | NHSO₂C₂H₅ | H | H | CH₃ | H | H | H | O |
| 7 | NHSO₂C₃H₇ | H | H | CH₃ | H | H | H | O |
| 8 | NHSO₂C₄H₉ | H | H | CH₃ | H | H | H | O |
| 9 | NHSO₂C₄H₉ | H | H | H | H | H | 6-CO₂Me | O |
| 11 | NHSO₂CH₃ | H | H | H | CH₃ | H | H | O |
| 12 | NHSO₂CH₃ | H | H | CH₃ | H | H | H | C(CN)₂ |
| 13 | NHSO₂CH₃ | H | H | H | H | H | 6-CO₂Me | O |
| 14 | COOH | H | H | H | H | H | H | C(CN)₂ |
| 15 | H | H | H | H | H | H | H | O |
| 16 | H | NHSO₂CH₃ | H | CH₃ | H | H | H | O |
| 17 | NHSO₂CH₃ | H | H | CH₃ | CH₃ | H | H | O |
| 18 | H | NHSO₂CH₃ | H | H | H | H | H | O |
| 19 | CO₂CH₃ | H | H | H | H | H | H | O |
| 20 | H | COOH | H | H | H | H | H | O |
| 21 | H | COOH | H | CH₃ | CH₃ | H | H | O |
| 22 | COOH | H | H | H | H | CH₃ | H | O |
| 23 | COOH | H | H | H | H | H | 6-COOH | O |
| 24 | NHSO₂CH₃ | H | H | H | H | H | 6-COOH | O |
| 25 | OH | H | H | H | H | H | H | O |
| 26 | OH | OH | H | CH₃ | CH₃ | H | H | O |
| 27 | SO₂NHCH₃ | H | H | H | H | H | 6-CO2Me | O |
| 28 | OH | H | OH | H | H | H | H | O |

Dye 29

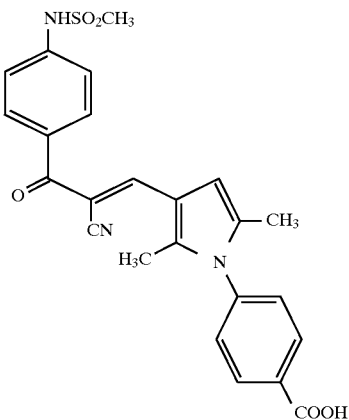

-continued
Dye 30
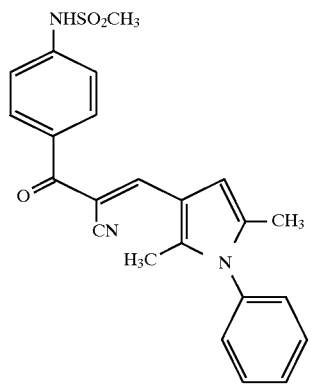
Dye 31
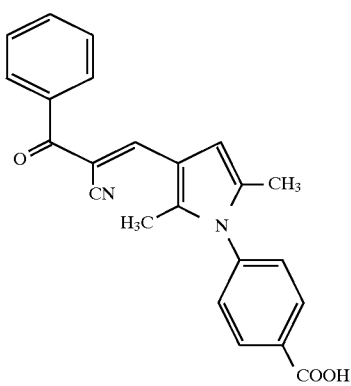
Dye 32
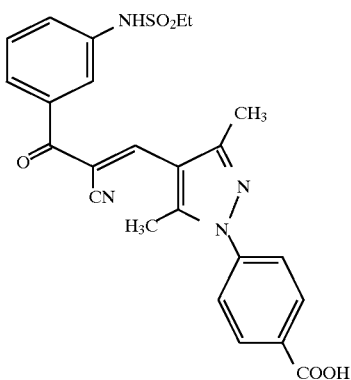
Dye 33
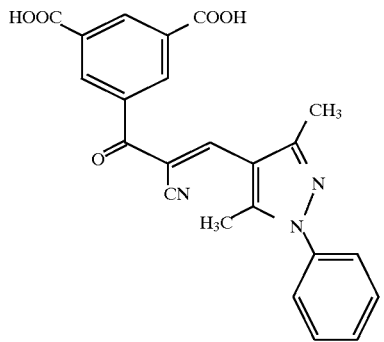

-continued
Dye 34
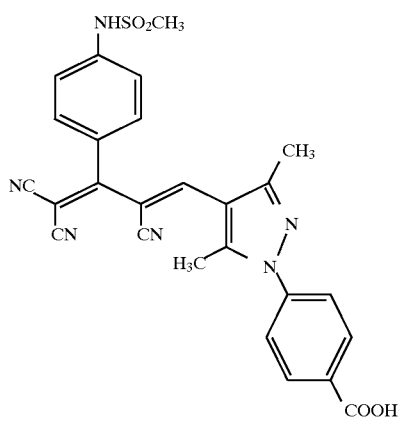
Dye 35
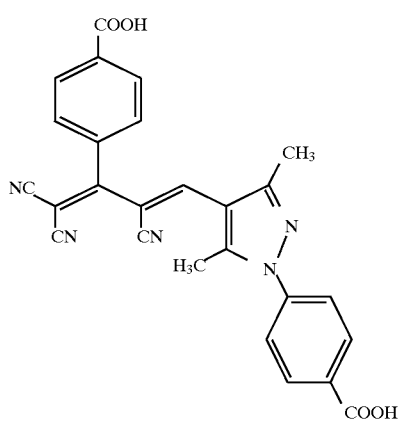
Dye 36
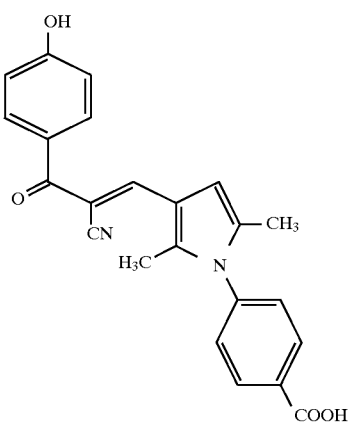
Dye 37
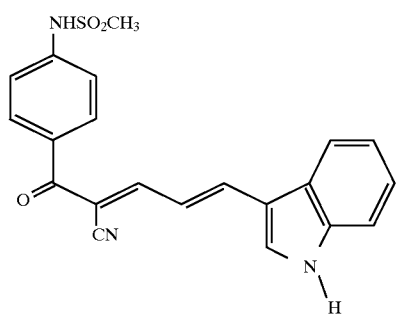

Dye 38 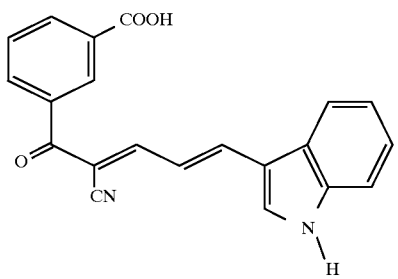
Dye 39 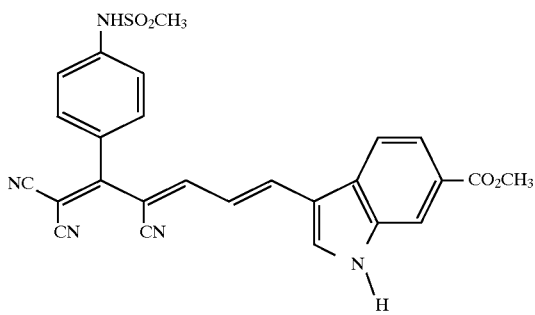
Dye 40 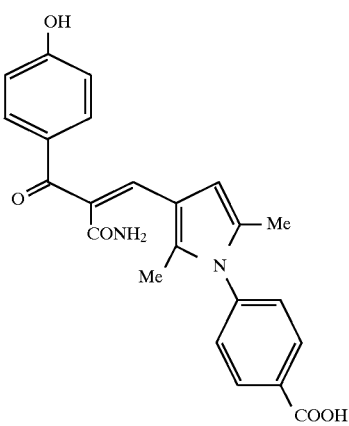
Dye 41 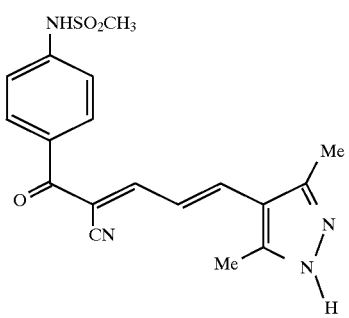

-continued
Dye 42
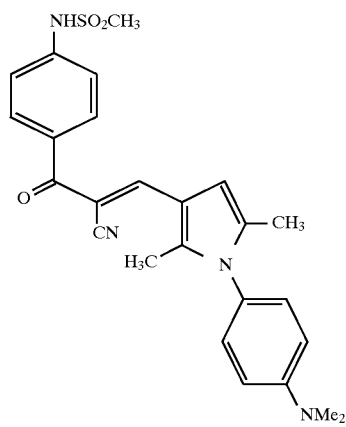
Dye 43
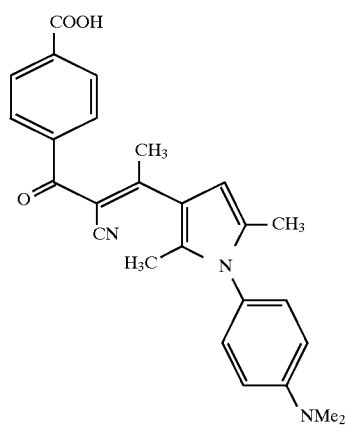
Dye 44
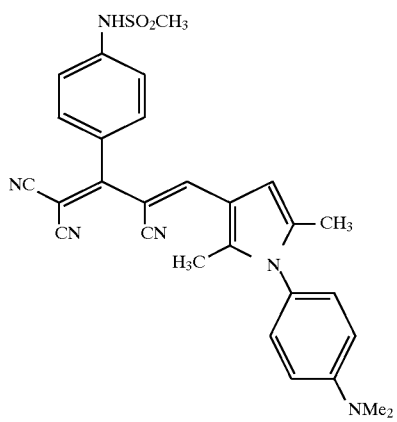
Dye 45
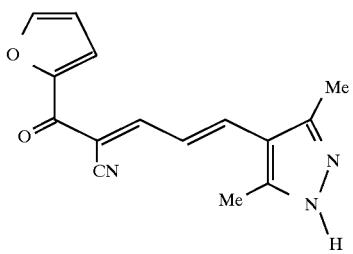

Dye 46 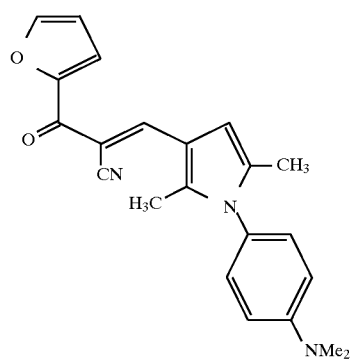
Dye 47 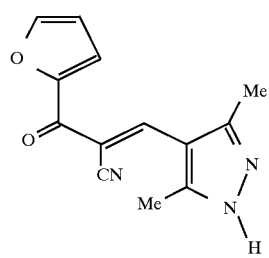
Dye 48 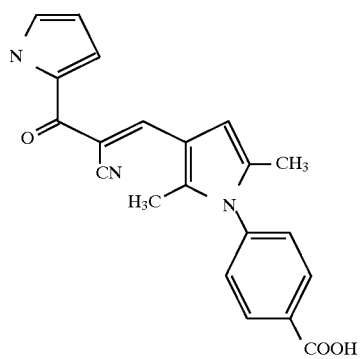
Dye 49 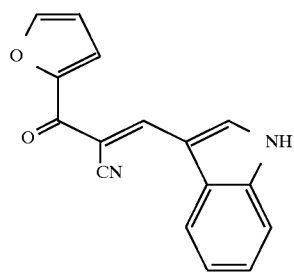
Dye 50 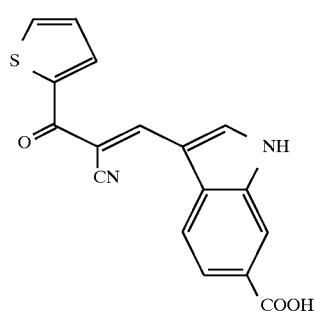

Dye 51

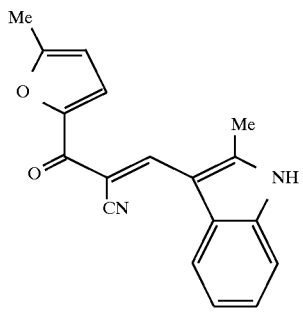

Dye 52

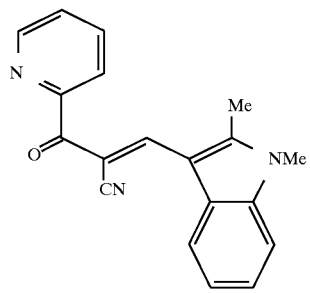

The dyes of Formula (I) can be prepared by synthetic techniques well-known in the art, as illustrated by the synthetic examples below. Such techniques are further illustrated, for example, in "*The Cyanine Dyes and Related Compounds*", Frances Hamer, Interscience Publishers, 1964.

The dyes of Formula (I) may be incorporated in a hydrophilic layer of a photographic element in any known way (e.g., with the aid of a high-boiling non-polar organic solvent), but are preferably in the form of a solid particle dispersion (i.e., the dye is in the form of solid particles of microscopic size) for incorporation into a layer such as a hydrophilic colloid layer of a photographic element. The solid particle dispersion can be formed by precipitating the dye in the form of a dispersion and/or by well-known milling techniques, e.g., ball-milling, sand-milling, media-milling or colloid-milling (preferably media-milling) the dye in the presence of a dispersing agent. The dispersion of dye particles should have a mean diameter of less than 10 mm and preferably less than 1 mm. The dye particles can be prepared in sizes ranging down to about 0.01 mm.

The dyes may be located in any layer of the element where it is desirable to absorb light, but it is particularly advantageous to locate them in a layer where they will be solubilized and washed out during processing. Useful amounts of dye range from 1 to 1000 mg/m$^2$. The dye should be present in an amount sufficient to yield an optical density at the absorbance D-max in the visible region before processing of at least 0.10 density units and preferably at least 0.50 density units. This optical density will generally be less than 5.0 density units for most photographic applications.

The dyes of the invention can be used as interlayer dyes, trimmer dyes, or antihalation dyes. They can be used to prevent crossover in X-ray materials as disclosed in U.S. Pat. Nos. 4,900,652 and 4,803,150 and European Patent Application Publication No. 0 391 405, to prevent unwanted light from reaching a sensitive emulsion layer of a multicolor photographic element as disclosed in U.S. Pat No. 4,988,611, and for other uses as indicated by the absorbance spectrum of the particular dye. The dyes can be used in a separate filter layer or as an intergrain absorber.

The hydrophilic colloid used in the present invention can be any known type, such as a hydrophilic colloid (e.g., gelatin), polyvinyl alcohol, and the like, as are well-known in the art as discussed more fully below.

The support of the element of the invention can be any of a number of well-known supports for photographic elements as discussed more fully below.

The photographic elements made by the method of the present invention can be single color elements or multicolor elements. Multicolor elements contain dye image-forming units sensitive to each of the three primary regions of the spectrum. Each unit can be comprised of a single emulsion layer or of multiple emulsion layers sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer.

A typical multicolor photographic element comprises a support bearing a cyan dye image-forming unit comprised of at least one red-sensitive silver halide emulsion layer having associated therewith at least one cyan dye-forming coupler, a magenta dye image-forming unit comprising at least one green-sensitive silver halide emulsion layer having associated therewith at least one magenta dye-forming coupler, and a yellow dye image-forming unit comprising at least one blue-sensitive silver halide emulsion layer having associated therewith at least one yellow dye-forming coupler. The element can contain additional layers, such as filter layers, interlayers, overcoat layers, subbing layers, and the like. All of these can be coated on a support which can be transparent or reflective (for example, a paper support).

Photographic elements of the present invention may also usefully include a magnetic recording material as described in *Research Disclosure*, Item 34390, November 1992, or a transparent magnetic recording layer such as a layer containing magnetic particles on the underside of a transparent support as in U.S. Pat. No. 4,279,945 and U.S. Pat. No. 4,302,523. The element typically will have a total thickness (excluding the support) of from 5 to 30 microns. While the order of the color sensitive layers can be varied, they will normally be red-sensitive, green-sensitive and blue-sensitive, in that order on a transparent support, (that is, blue sensitive furthest from the support) and the reverse order on a reflective support being typical.

The present invention also contemplates the use of photographic elements of the present invention in what are often referred to as single use cameras (or "film with lens" units). These cameras are sold with film preloaded in them and the entire camera is returned to a processor with the exposed film remaining inside the camera. Such cameras may have glass or plastic lenses through which the photographic element is exposed.

In the following discussion of suitable materials for use in elements of this invention, reference will be made to *Research Disclosure,* September 1994, Number 365, Item 36544, which will be identified hereafter by the term "Research Disclosure I." The Sections hereafter referred to are Sections of the Research Disclosure I unless otherwise indicated. All Research Disclosures referenced are published by Kenneth Mason Publications, Ltd., Dudley Annex, 12a North Street, Emsworth, Hampshire P010 7DQ, ENGLAND. The foregoing references and all other references cited in this application, are incorporated herein by reference.

The silver halide emulsions employed in the photographic elements of the present invention may be negative-working, such as surface-sensitive emulsions or unfogged internal latent image forming emulsions, or positive working emulsions of internal latent image forming emulsions (that are either fogged in the element or fogged during processing). Suitable emulsions and their preparation as well as methods of chemical and spectral sensitization are described in Sections I through V. Color materials and development modifiers are described in Sections V through XX. Vehicles which can be used in the photographic elements are described in Section II, and various additives such as brighteners, antifoggants, stabilizers, light absorbing and scattering materials, hardeners, coating aids, plasticizers, lubricants and matting agents are described, for example, in Sections VI through XIII. Manufacturing methods are described in all of the sections, layer arrangements particularly in Section XI, exposure alternatives in Section XVI, and processing methods and agents in Sections XIX and XX.

With negative working silver halide a negative image can be formed. Optionally a positive (or reversal) image can be formed although a negative image is typically first formed.

The photographic elements of the present invention may also use colored couplers (e.g. to adjust levels of interlayer correction) and masking couplers such as those described in EP 213 490; Japanese Published Application 58-172,647; U.S. Pat. 2,983,608; German Application DE 2,706,117C; U.K. Patent 1,530,272; Japanese Application A-113935; U.S. Pat. No. 4,070,191 and German Application DE 2,643,965. The masking couplers may be shifted or blocked.

The photographic elements may also contain materials that accelerate or otherwise modify the processing steps of bleaching or fixing to improve the quality of the image. Bleach accelerators described in EP 193 389; EP 301 477; U.S. Pat. No. 4,163,669; U.S. Pat. No. 4,865,956; and U.S. Pat. No. 4,923,784 are particularly useful. Also contemplated is the use of nucleating agents, development accelerators or their precursors (UK Patent 2,097,140; U.K. Patent 2,131,188); electron transfer agents (U.S. Pat. No. 4,859,578; U.S. Pat. No. 4,912,025); antifogging and anti color-mixing agents such as derivatives of hydroquinones, aminophenols, amines, gallic acid; catechol; ascorbic acid; hydrazides; sulfonamidophenols; and non color-forming couplers.

The elements may also contain filter dye layers comprising colloidal silver sol or yellow and/or magenta filter dyes and/or antihalation dyes (particularly in an undercoat beneath all light sensitive layers or in the side of the support opposite that on which all light sensitive layers are located) either as oil-in-water dispersions, latex dispersions or as solid particle dispersions. Additionally, they may be used with "smearing" couplers (e.g. as described in U.S. Pat. No. 4,366,237; EP 096 570; U.S. Pat. No. 4,420,556; and U.S. Pat. No. 4,543,323.) Also, the couplers may be blocked or coated in protected form as described, for example, in Japanese Application 61/258,249 or U.S. Pat. No. 5,019,492.

The photographic elements may further contain other image-modifying compounds such as "Developer Inhibitor-Releasing" compounds (DIR's). Useful additional DIR's for elements of the present invention, are known in the art and examples are described in U.S. Pat. Nos. 3,137,578; 3,148,022; 3,148,062; 3,227,554; 3,384,657; 3,379,529; 3,615,506; 3,617,291; 3,620,746; 3,701,783; 3,733,201; 4,049,455; 4,095,984; 4,126,459; 4,149,886; 4,150,228; 4,211,562; 4,248,962; 4,259,437; 4,362,878; 4,409,323; 4,477,563; 4,782,012; 4,962,018; 4,500,634; 4,579,816; 4,607,004; 4,618,571; 4,678,739; 4,746,600; 4,746,601; 4,791,049; 4,857,447; 4,865,959; 4,880,342; 4,886,736; 4,937,179; 4,946,767; 4,948,716; 4,952,485; 4,956,269; 4,959,299; 4,966,835; 4,985,336 as well as in patent publications GB 1,560,240; GB 2,007,662; GB 2,032,914; GB 2,099,167; DE 2,842,063, DE 2,937,127; DE 3,636,824; DE 3,644,416 as well as the following European Patent Publications: 272,573; 335,319; 336,411; 346, 899; 362, 870; 365,252; 365,346; 373,382; 376,212; 377,463; 378,236; 384,670; 396,486; 401,612; 401,613.

DIR compounds are also disclosed in "Developer-Inhibitor-Releasing (DIR) Couplers for Color Photography," C. R. Barr, J. R. Thirtle and P. W. Vittum in Photographic Science and Engineering, Vol. 13, p. 174 (1969), incorporated herein by reference.

It is also contemplated that the concepts of the present invention may be employed to obtain reflection color prints as described in Research Disclosure, November 1979, Item 18716, available from Kenneth Mason Publications, Ltd, Dudley Annex, 12a North Street, Emsworth, Hampshire P0101 7DQ, England, incorporated herein by reference. The emulsions and materials to form elements of the present invention, may be coated on pH adjusted support as described in U.S. Pat. No. 4,917,994; with epoxy solvents (EP 0 164 961); with additional stabilizers (as described, for example, in U.S. Pat. No. 4,346,165; U.S. Pat. No. 4,540, 653 and U.S. Pat. No. 4,906,559); with ballasted chelating agents such as those in U.S. Pat. No. 4,994,359 to reduce sensitivity to polyvalent cations such as calcium; and with stain reducing compounds such as described in U.S. Pat. No. 5,068,171 and U.S. Pat. No. 5,096,805. Other compounds useful in the elements of the invention are disclosed in Japanese Published Applications 83-09,959; 83-62,586; 90-072,629, 90-072,630; 90-072,632; 90-072,633; 90-072, 634; 90-077,822; 90-078,229; 90-078,230; 90-079,336; 90-079,338; 90-079,690; 90-079,691; 90-080,487; 90-080, 489; 90-080,490; 90-080,491; 90-080,492; 90-080,494; 90-085,928; 90-086,669; 90-086,67b; 90-087,361; 90-087, 362; 90-087,363; 90-087,364; 90-088,096; 90-088,097; 90-093,662; 90-093,663; 90-093,664; 90-093,665; 90-093, 666; 90-093,668; 90-094,055; 90-094,056; 90-101,937; 90-103,409; 90-151,577.

The silver halide used in the photographic elements may be silver iodobromide, silver bromide, silver chloride, silver chlorobromide, silver chloroiodobromide, and the like.

The type of silver halide grains preferably include polymorphic, cubic, and octahedral. The grain size of the silver halide may have any distribution known to be useful in photographic compositions, and may be either poly-dipersed or monodispersed.

Tabular grain silver halide emulsions may also be used. Tabular grains are those with two parallel major faces each clearly larger than any remaining grain face and tabular grain emulsions are those in which the tabular grains account for at least 30 percent, more typically at least 50 percent, preferably >70 percent and optimally >90 percent of total grain projected area. The tabular grains can account for substantially all (>97 percent) of total grain projected area. The tabular grain emulsions can be high aspect ratio tabular grain emulsions—i.e., ECD/t>8, where ECD is the diameter of a circle having an area equal to grain projected area and t is tabular grain thickness; intermediate aspect ratio tabular grain emulsions—i.e., ECD/t=5 to 8; or low aspect ratio tabular grain emulsions—i.e., ECD/t=2 to 5. The emulsions typically exhibit high tabularity (T), where T (i.e., ECD/t$^2$) >25 and ECD and t are both measured in micrometers ($\mu$m). The tabular grains can be of any thickness compatible with achieving an aim average aspect ratio and/or average tabu-larity of the tabular grain emulsion. Preferably the tabular grains satisfying projected area requirements are those hav-ing thicknesses of <0.3 $\mu$m, thin (<0.2 $\mu$m) tabular grains being specifically preferred and ultrathin (<0.07 $\mu$m) tabular grains being contemplated for maximum tabular grain per-formance enhancements. When the native blue absorption of iodohalide tabular grains is relied upon for blue speed, thicker tabular grains, typically up to 0.5 $\mu$m in thickness, are contemplated.

High iodide tabular grain emulsions are illustrated by House U.S. Pat. No. 4,490,458, Maskasky U.S. Pat. No. 4,459,353 and Yagi et al EPO 0 410 410.

Tabular grains formed of silver halide(s) that form a face centered cubic (rock salt type) crystal lattice structure can have either {100} or {111} major faces. Emulsions contain-ing {111} major face tabular grains, including those with controlled grain dispersities, halide distributions, twin plane spacing, edge structures and grain dislocations as well as adsorbed {111} grain face stabilizers, are illustrated in those references cited in *Research Disclosure I,* Section I.B.(3) (page 503).

The silver halide grains to be used in the invention may be prepared according to methods known in the art, such as those described in *Research Disclosure I* and James, *The Theory of the Photographic Process.* These include methods such as ammoniacal emulsion making, neutral or acidic emulsion making, and others known in the art. These meth-ods generally involve mixing a water soluble silver salt with a water soluble halide salt in the presence of a protective colloid, and controlling the temperature, pAg, pH values, etc, at suitable values during formation of the silver halide by precipitation.

The silver halide to be used in the invention may be advantageously subjected to chemical sensitization with noble metal (for example, gold) sensitizers, middle chalco-gen (for example, sulfur) sensitizers, reduction sensitizers and others known in the art. Compounds and techniques useful for chemical sensitization of silver halide are known in the art and described in *Research Disclosure I* and the references cited therein.

The photographic elements of the present invention, as is typical, provide the silver halide in the form of an emulsion. Photographic emulsions generally include a vehicle for coating the emulsion as a layer of a photographic element. Useful vehicles include both naturally occurring substances such as proteins, protein derivatives, cellulose derivatives (e.g., cellulose esters), gelatin (e.g., alkali-treated gelatin such as cattle bone or hide gelatin, or acid treated gelatin such as pigskin gelatin), gelatin derivatives (e.g., acetylated gelatin, phthalated gelatin, and the like), and others as described in *Research Disclosure I.* Also useful as vehicles or vehicle extenders are hydrophilic water-permeable col-loids. These include synthetic polymeric peptizers, carriers, and/or binders such as poly(vinyl alcohol), poly(vinyl lactams), acrylamide polymers, polyvinyl acetals, polymers of alkyl and sulfoalkyl acrylates and methacrylates, hydro-lyzed polyvinyl acetates, polyamides, polyvinyl pyridine, methacrylamide copolymers, and the like, as described in *Research Disclosure I.* The vehicle can be present in the emulsion in any amount useful in photographic emulsions. The emulsion can also include any of the addenda known to be useful in photographic emulsions. These include chemi-cal sensitizers, such as active gelatin, sulfur, selenium, tellurium, gold, platinum, palladium, iridium, osmium, rhenium, phosphorous, or combinations thereof. Chemical sensitization is generally carried out at pAg levels of from 5 to 10, pH levels of from 5 to 8, and temperatures of from 30 to 80° C., as described in *Research Disclosure I,* Section IV (pages 510–511) and the references cited therein.

The silver halide may be sensitized by sensitizing dyes by any method known in the art, such as described in *Research Disclosure I.* The dye may be added to an emulsion of the silver halide grains and a hydrophilic colloid at any time prior to (e.g., during or after chemical sensitization) or simultaneous with the coating of the emulsion on a photo-graphic element. The dyes may, for example, be added as a solution in water or an alcohol. The dye/silver halide emul-sion may be mixed with a dispersion of color image-forming coupler immediately before coating or in advance of coating (for example, 2 hours).

Photographic elements of the present invention are pref-erably imagewise exposed using any of the known techniques, including those described in *Research Disclo-sure I,* section XVI. This typically involves exposure to light in the visible region of the spectrum, and typically such exposure is of a live image through a lens, although expo-sure can also be exposure to a stored image (such as a computer stored image) by means of light emitting devices (such as light emitting diodes, CRT and the like).

Photographic elements comprising the composition of the invention can be processed in any of a number of well-known photographic processes utilizing any of a number of well-known processing compositions, described, for example, in *Research Disclosure I,* or in T. H. James, editor, *The Theory of the Photographic Process,* 4th Edition, Macmillan, New York, 1977. In the case of processing a negative working element, the element is treated with a color developer (that is one which will form the colored image dyes with the color couplers), and then with a oxidizer and a solvent to remove silver and silver halide. In the case of processing a reversal color element, the element is first treated with a black and white developer (that is, a developer which does not form colored dyes with the coupler compounds) followed by a treatment to fog silver halide (usually chemical fogging or light fogging), followed by treatment with a color developer. Preferred color developing agents are p-phenylenediamines. Especially preferred are:

4-amino N,N-diethylaniline hydrochloride,
4-amino-3-methyl-N,N-diethylaniline hydrochloride,
4-amino-3-methyl-N-ethyl-N-(β-(methanesulfonamido) ethylaniline sesquisulfate hydrate, 4-amino-3-methyl-N-ethyl-N-(β-hydroxyethyl)aniline sulfate, 4-amino-3-β-(methanesulfonamido)ethyl-N,N-diethylaniline hydrochloride and 4-amino-N-ethyl-N-(2-methoxyethyl)-m-toluidine di-p-toluene sulfonic acid.

Development is followed by bleaching and fixing steps, a combined bleach-fix process, to remove silver or silver halide, washing and drying.

Synthesis of Dye 1

A mixture of 4-methanesulfonamidobenzoylacetonitrile (8 g, 33.6 mmol), 3-formylindole (7.3 g, 50.4 mmol) and ammonium acetate (1.3 g, 16.8 mmol) in 100 mL ethanol was heated to reflux over a 20 min period, and held at reflux for 45 min. The resulting mixture was then cooled to 25° C., and the precipitate collected by filtration and washed with ethanol. The collected solid was slurried in 50 mL hot acetic acid for 30 min and the resulting pure dye was collected by filtration and dried. Isolated 11.1 g (90%) of Dye 1 as a yellow solid. All analytical data were consistent with the structure.

Synthesis of Dye 3

A mixture 2-(4-methylsulfonamido)phenyl-1,1,3-tricyanopropene (6 g, 21 mmol) and 3-formylindole (4 g, 28 mmol) in 60 mL acetic acid was heated to reflux and held for 2.5 h. The mixture was then cooled to 25° C. and the resulting precipitate collected by filtration and washed with acetic acid. The isolated solid was slurried in hot acetic acid for 30 min, then collected by filtration and dried. Isolated 6.9 g (80%) of Dye 3. All analytical data were consistent with the structure.

Synthesis of Dye 5

A mixture of 4-methanesulfonamidobenzoylacetonitrile (10 g, 42 mmol), 2-methylindole-3-carboxaldehyde (7.3 g, 46 mmol) and ammonium acetate (1 g, 12.6 mmol) in 80 mL acetic acid was heated to reflux and held 3 h. The reaction was then cooled to 25° C., and the precipitated dye collected by filtration and washed with acetic acid. The crude dye was slurried in hot acetic acid for 30 min then collected by filtration and dried. Isolated 13 g (82%) of Dye 5. All analytical data were consistent with the structure.

EXPERIMENTAL EXAMPLES

Example 1

Dye Wandering and Solubilization

Dyes 1–8 according to formulae (III) and comparative Dyes A and C were prepared as microcrystalline dye dispersions by ballmilling according to the following procedure. Water (21.7 mL) and a 6.7% solution of Triton X-200® surfactant (2.65 g) were placed in a 60 mL screw-capped bottle. A 1.0 g sample of dye was added to this solution. Zirconium oxide beads (40 mL, 2 mm diameter) were added and the container with the cap tightly secured was placed in a mill and the contents milled for four days. The container was removed and the contents added to a 12.5% aqueous gelatin (8.0 g) solution. The new mixture was placed on a roller mill for 10 minutes and the resulting mixture was filtered to remove the zirconium oxide beads. The resulting dye dispersion had a particle size mean diameter less than 1.0 μm.

The microcrystalline dye dispersions of these dyes were coated on a polyester support according to the following procedure. A spreading agent (surfactant 10G) and a hardener (bis(vinylsulfonylmethyl)ether) were added to the dye-gelatin melt prepared as described above. A melt from this mixture was then coated on a poly(ethylene terephthalate) support to achieve a dye coverage of 0.27 g/m$^2$, a gelatin coverage of 1.61 g/m$^2$, and a hardener level of 0.016 g/m$^2$. The absorbance of the dye dispersion was measured with a spectrophotometer. Identical elements were subjected to a 5 minute distilled water wash (2–3 gal/min flow rate), and to Kodak E-6® processing (which is described in *British Journal of Photography Annual*, 1977, pp.194–97) and the absorbance was measured for each. The results are shown in Table I.

TABLE I

| Dye | D-max at λmax | D-max after Water Wash | D-max after E-6 ®Processing |
| --- | --- | --- | --- |
| 1 | 2.44 | 2.42 | 0.01 |
| 2 | 1.67 | 1.60 | 0.01 |
| 3 | 1.40 | 1.41 | 0.01 |
| 4 | 2.00 | 1.99 | 0.01 |
| 5 | 1.72 | 1.79 | 0.01 |
| 6 | 1.89 | 1.89 | 0.01 |
| 7 | 1.76 | 1.75 | 0.01 |
| 8 | 1.58 | 1.58 | 0.01 |
| A | 1.33 | 1.32 | 0.01 |
| C | 1.27 | 1.26 | 0.27 |

These results show that the dyes of formulae (I) and (II) are not affected by the water wash, indicating no wandering at coating pH, but are fully solubilized for removal and/or decolorization during photographic processing. A similarly substituted comparative example, Dye C, (sulfonamido derivative of Dye 1 in U.S. Pat. No. 5,213,957) however, leaves significant post process stain.

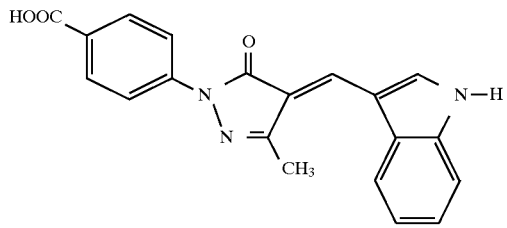

Comparative Dye A
(U.S. Pat. 5,213,957 Dye 1)

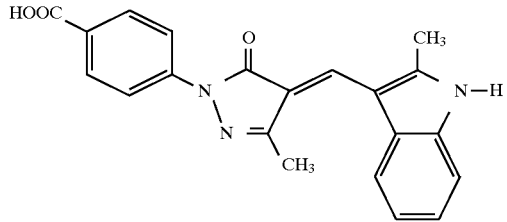

Comparative Dye B
(Dye of type in U.S. Pat. 5,213,957)

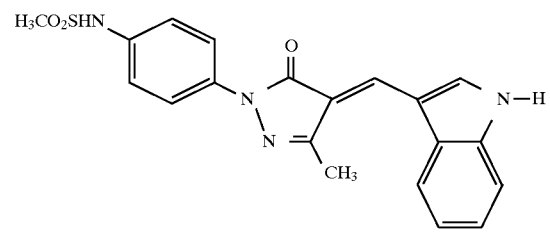

Comparative Dye C
(Dye of type in U.S. Pat. 5,213,957)

Example 2

Covering Power

Solid particle dispersions of Dyes 1–8 and comparative Dyes A, B and C were prepared and coated on a polyester support in a manner similar to that described in Example 1. The dyes of the invention, Dyes 1,2,4,5,6,7 and 8 are structurally analogous to comparative Dyes A,B and C except the inventive dyes have benzoylacetonitrile functionality as the acidic nuclei instead of the pyrazolone functionality described as a preferred embodiment in U.S. Pat. No. 5,213,957. The absorbance of the dye dispersions were measured with a spectrophotometer, and the Covering Power (C.P.) was determined for each dye. The covering power of a dye in a solid particle dispersion coating is defined as the optical density at a chosen λmax divided by the coated dye laydown in mg/ft$^2$. For this investigation, the C.P. values of the dyes were compared based on the optical density at their relative λmax's (Dmax). The following results shown in Table II were achieved:

TABLE II

| Dye | D-max at λmax | Dye coverage (mg/ft$^2$) | C.P. |
| --- | --- | --- | --- |
| 1 | 2.44 | 25 | 0.096 |
| 2 | 1.67 | 25 | 0.067 |
| 3 | 1.40 | 25 | 0.060 |
| 4 | 2.00 | 25 | 0.080 |
| 5 | 1.72 | 25 | 0.068 |
| 6 | 1.89 | 25 | 0.076 |
| 7 | 1.76 | 25 | 0.070 |
| 8 | 1.58 | 25 | 0.063 |
| A | 1.33 | 25 | 0.053 |
| B | 1.23 | 25 | 0.049 |
| C | 1.27 | 25 | 0.050 |

The above results demonstrate that the dyes of the invention have greater covering power than those described in the prior art.

Example 3

Spectral Shape of Solid Particle Dyes I

Microcrystalline dye dispersions of Dyes 1–4 and comparative Dyes A, B and C were prepared and coated on a polyester support in a manner similar to that described in Example 1. The absorbance of the dye dispersions were measured with a spectrophotometer, and a ratio of each dye's optical density (O.D.) at 480 nm and 510 nm (i.e O.D at 480 nm/O.D. at 510 nm) were calculated. A high ratio is preferable for a yellow filter dye being coated above a green-sensitive emulsion to prevent blue light from reaching the blue/green-sensitive emulsion without significantly attenuating green speed past 500 nm. The following results shown in Table III were achieved:

TABLE III

| Dye | O.D at 480 nm/ O.D. at 510 nm |
| --- | --- |
| 1 | 15.0 |
| 2 | 4.2 |
| 3 | 3.2 |
| 4 | 4.1 |
| 5 | 7.5 |
| A | 2.1 |
| B | 2.1 |
| C | 2.7 |

These results demonstrate that the dyes of the invention possess superior spectral properties as solid particle dispersions for use as yellow filter dyes as compared to Dyes A, B, and C because they are sharp cutting near 500 nm.

Example 4

Spectral Shape of Solid Particle Dyes II

Solid particle dispersions of Dyes 5–8 and comparative Dyes A, B and C were prepared and coated on a polyester support in a manner similar to that described in Example 1. The absorbance of the dye dispersions were measured with a spectrophotometer, and a ratio of each dye's optical density (O.D.) at 450 nm and 490 nm (i.e O.D at 450 nm/O.D. at 490 nm) was calculated. A high ratio is preferable for a yellow filter dye being coated above a green-sensitive emulsion to prevent blue light from reaching the blue/green-sensitive emulsion without significantly attenuating green speed past 480 nm. Such dyes would be desirable for use in photographic elements requiring a slightly more hypsochromic blue light filtration envelope than that provided by the dyes of the invention tabulated in Table 3. The following results shown in Table IV were achieved:

TABLE IV

| Dye | O.D at 450 nm/ O.D. at 490 nm |
| --- | --- |
| 5 | 5.6 |
| 6 | 18.5 |
| 7 | 15.0 |
| 8 | 15.0 |
| A | 2.3 |
| B | 1.6 |
| C | 3.5 |

These results demonstrate that the dyes of the invention possess superior spectral properties as solid particle dispersions for use as yellow filter dyes as compared to Dyes A, B, and C because they are sharp cutting near 480 nm.

Example 5

Seasoning Effects Of The Dyes In Developer

The dyes of this invention are generally designed to decolorize during processing via chemical reaction and/or solubilization, usually during development. As such, it is important to assess the possible sensitometric effects that these dyes might have as their concentration builds up in developer, that is as the developer becomes "seasoned" with the dye. Such seasoning effects are readily simulated by simply adding the dye to developer at an appropriate level. For example, if the dye is coated at 0.1 g/m$^2$ and the developer is replenished at a rate of 0.5L/m$^2$ (typical for Process C-41 developer replenishment) the theoretical seasoned level of dye in developer would be 0.2 g/L.

In order to test the possible sensitometric effects of these dyes, a commercially available color negative film (Kodak Royal Gold 1000), was exposed and processed in a standard Process C-41 developer and in developer to which was added 0.2g/L of a dye of this invention. The processing protocol is shown below.

| | |
| --- | --- |
| 3.25 min | Development* (37.9° C.) |
| 3.00 min | Bleach** (37.9° C.) |
| 1.00 min | Water wash (35.0° C.) |
| 3.00 min | Fixing*** (37.9° C.) |
| 3.00 min | Water wash (35.0° C.) |
| 1.00 min | KODAK PHOTO-FLO ™ rinse (37.9° C.) |
| 5.00 min | dry |

*The developing solution (per liter) was an aqueous solution of potassium carbonate (37.5 g), sodium sulfite (3.7 g), potassium iodide (1.2 mg), sodium bromide (1.3 g), diethylenetriaminepentaacetic acid (8.4 g of 40% w/w sln), hydroxylamine sulfate (2.4 g), and KODAK Color Developing Agent CD4 (4.5 g), and had a pH of 10.05.

-continued

**The bleaching solution was KODAK FLEXICOLOR BLEACH III.
***The fixing solution (per liter) was aquewous solutin of sodium metabisultite (11.8 g) and a solution (162 ml) of ammonium thiosulfate (56.5%) and ammonium sulfite (4%), and had a ph of 6.5.

The dye was allowed to react in the developer at room temperature for approximately 16 hours prior to processing. Table V(a) shows the density changes in unexposed areas of the film (ΔD-min, relative to developer without dye) caused by the presence of the dye in developer.

TABLE V(a)

| Dye | G | $R^2$ | $R^4$ | ΔDmin Blue | ΔDmin Green | ΔDmin Red |
|-----|------|-------|---------------------------------|------|-------|-------|
| 1   | O    | H     | $NHSO_2CH_3$                    | +0.37 | −0.02 | +0.08 |
| 6   | O    | H     | $NHSO_2C_3H_7$                  | +0.31 | −0.02 | +0.05 |
| 17  | O    | $CH_3$| $NHSO_2CH_3$                    | +0.03 | −0.01 | +0.03 |
| 7   | O    | $CH_3$| $NHSO_2C_3H_7$                  | +0.01 | 0.00  | +0.01 |
| 12  | $C(CN)_2$ | H | $NHSO_2CH_3$                  | +0.04 | 0.00  | +0.01 |
| 3   | $C(CN)_2$ | $CH_3$ | $NHSO_2CH_3$             | +0.01 | −0.01 | 0.00  |

To minimize the possible seasoning effects of the in conventional Process C-41 developer, the results in Table V(a) show that dyes of the following formal (IV) are preferred:

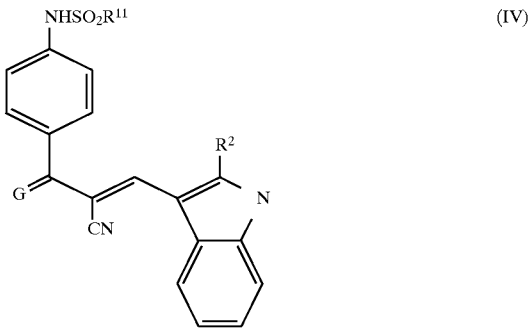

(IV)

where G is O or $C(CN)_2$, $R^2$ is hydrogen or substituted or substituted alkyl and $R^{11}$ is substituted or unsubstituted alkyl, with the proviso that is G is O, then $R^2$ is substituted or unsubstituted alkyl.

Commercially available color negative film was exposed and processed (using the protocol set forth above) using a standard C-41 developer solution containing 2.4 g/L hydroxylamine sulfite (Developer I), a C-41 developer solution containing no hydroxylamine (Developer II) or a C-41 developer solution in which the hydroxylamine was replaced with diethylhydroxylamine (Developer III).

The film was also processed in these same developer solutions to which 0.2 g/L of D1 was added. Table V(a) shows the Dmin density changes caused by Dye 1 in the developer.

TABLE V(b)

| Developer | ΔDmin Blue | ΔDmin Green | ΔDmin Red |
|-----------|------|-------|-------|
| Developer I | +0.37 | −0.02 | +0.08 |
| Developer II | +0.01 | 0.00 | 0.00 |
| Developer III | +0.01 | 0.00 | 0.00 |

These results show that when Dye 1 is present, the photographic element is preferably developed using a developer solution that does not contain hydroxylamine, but contains no hydroxylamine or a substituted hydroxylamine.

The invention has been described in detail with particular reference to preferred embodiments, but it will be understood that variations and modifications can be effected within the spirit and scope of the invention.

What is claimed is:

1. A photographic element comprising at least one light-sensitive hydrophilic colloid layer, said photographic element containing a dye of Formula (I):

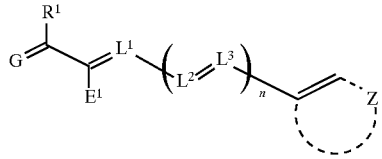

I wherein G represents O or dicyanovinyl; E represents an electron withdrawing group; $R^1$ represents a substituted or unsubstituted aryl group or a substituted or unsubstituted hetereoaryl group $L^1$, $L^2$ and $L^3$ each independently represent substituted or unsubstituted methine groups; Z represents non-metal atoms which may be assembled to form an indole ring structure; n represents 0 or 1; and wherein the dye comprises at least one ionizable group with a pKa value between 4–12.

2. A photographic element according to claim 1, wherein the photographic element further comprises at least one non-light sensitive hydrophilic colloid layer and the dye of Formula (1) is in the light sensitive layer or the non-light sensitive layer.

3. A photographic element according to claim 2, wherein the light sensitive layer comprises a silver halide emulsion.

4. A photographic element according to claim 1, wherein the ionizable group is sulfamoyl, carboxy or sulfonamido.

5. A photographic element according to claim 1, wherein Z forms an indole ring, a benzindole ring or a pyrrole ring.

6. A photographic element according to claim 1, wherein E is cyano and R is substituted or unsubstituted phenyl.

7. A photographic element according to claim 7, wherein G is O.

8. A photographic element according to claim 1, wherein R is phenyl or substituted phenyl.

9. A photographic element according to claim 8, wherein R is phenyl substituted with a sulfamoyl, carboxy or sulfonamido group.

10. A photographic element according to claim 1, wherein the dye is of Formula (III):

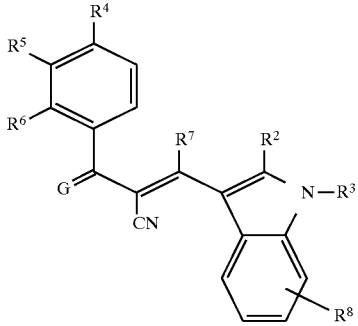

wherein G is as defined in claim 1, $R^2$ and $R^3$ independently represent hydrogen, or a substituted or unsubstituted alkyl, aryl, or acyl group; $R^4$, $R^5$, $R^6$ and $R^8$ each independently represent hydrogen, or a substituted or unsubstituted alkyl aryl, or aryloxy group or one of the following substituents: halogen, cyano, amino, alkoxy, alkoxycarbonyl, amido, acyl, alkylamino, carboxy, sulfonamido, sulfamoyl, or hydroxy; or represent atoms necessary to form a carbocyclic or heterocyclic ring fused with the aryl ring to which they are attached and R is a substituted alkyl or acyl group.

11. A photographic element according to claim 10, wherein R or R is $NHSO_2CH_3$.

12. A photographic element according to claim 10, wherein $R^8$ is H, $CO_2CH_3$, or COOH.

13. A photographic element according to claim 1, wherein the dye is of formula IV:

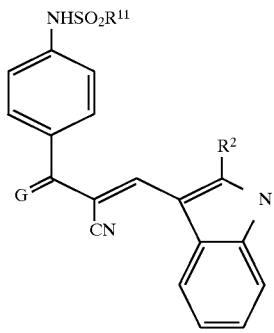

where G is O or $C(CN)_2$, $R^2$ is hydrogen or substituted or unsubstituted alkyl and $R^{11}$ is substituted or unsubstituted alkyl, with the proviso that is G is O, then $R^2$ is substitued or unsubstited alkyl.

14. A photographic element according to claim 13, wherein G is O or methyl, and $R^{11}$ is methyl or ethyl.

15. A photographic element according to claim 13, wherein G is dicyanovinyl, $R^2$ is hydrogen or methyl and $R^{11}$ is methyl or ethyl.

16. A photographic element according to claim 1, claim 10 or claim 13, wherein the dye is in a layer other than a light sensitive layer.

17. A photographic element according to claim 1, claim 10 or claims 13, wherein the dye exhibits strong absorbance below about 500 nm and no appreciable absorbance above about 500 nm.

18. A photographic element according to claim 1, claim 10 or claim 13, wherein the dye is present in an amount of 1 to 1000 mg/m².

19. A photographic element according to claim 1, claim 10 or claim 13, wherein the photographic element comprises a blue sensitive layer positioned above a green sensitive layer and the dye is in a non-light sensitive layer positioned between the blue sensitive layer and the green sensitive layer.

* * * * *